3,714,361
CERTAIN HYDROXAMIC ACIDS AS GROWTH
PROMOTING AGENTS
Kazuo Morimoto, Tsu-shi, and Etsuo Naito, Hannou-shi, Japan, assignors to Eisai Kabushiki Kaisha, Tokyo, Japan
No Drawing. Filed Jan. 21, 1970, Ser. No. 4,778
Int. Cl. A61k 27/00
U.S. Cl. 424—320                    6 Claims

ABSTRACT OF THE DISCLOSURE

Livestock growth-promoting agent consisting of hydroxamic acid represented by the formula

R—CO—NH—OH wherein R stands for an alkyl group. The growth-promoting agent according to the present invention is daily administrated to livestock in an amount ranging 1–30 mg. per kg. of the body-weight thereof advantageously in admixture with foodstuff. Feed conversion of the feed therefor intake is thus considerably enhanced. This results in a marked increment in the body-weight of the reared animals without undesirable effects such as an accumulation of the said agent in the body or organs of the reared animals and an acclimation of the animals toward the agent so that the animals are insensible to the latter, contrary to the known antibiotics hitherto employed as the growth-promoting agent.

---

This invention relates to a growth-promoting agent for livestock. More particularly, the present invention has the object of providing livestock with a growth-promoting agent consisting of a hydroxamic acid represented by the formula:

R—CO—NH—OH wherein R stands for an alkyl group. More particularly, the term "alkyl" used herein includes straight alkyl groups having $C_1$–$C_{12}$ carbon atoms such as methyl, ethyl, propyl butyl, pentyl, hexyl, heptyl, octyl, nonyl, decyl, undecyl, and dodecyl groups.

Various antibiotic preparations, nitrofuran derivatives and the like have hitherto been utilized as growth promoting agent for livestock. It was, however, found that these known agents have a defect that, when fed to livestock, a portion remains in organs and muscle of the animals as well as in milk provided by thus contaminated animals.

It has, therefore, been pointed out by The Food and Drug Administration (FDA) that the meat and milk from such contaminated animals have an injurious effect on the human body. These antibiotics are thus ruled subject to dosage regulation.

As a result of various experiments, we have found that a certain class of hydroxamic acids, which possesses anti-urease property, that is, the property of inactivating urease so that formation of ammonia from urea is prevented in the digestive tracts, show a remarkable growth-promoting activity on livestock without the aforementioned undesirable effect.

It was observed in our experiments that, when the aforementioned hydroxamic acid was continuously administrated for six months along with the conventional feed to a group of piglets in a daily amount of 1–30 mg. per kg. of the body-weight, such piglets had put on extra weight, say, 10–25% on the average, over a "control group" of the piglets reared with the feed without addition of the said hydroxamic acid for the same months.

It was also confirmed in our experiments that the optimum amount for the daily administration of such a growth-promoting agent to the livestock should be within the range of about 1–30 mg.; with a daily administration of less than 1 mg., there was observed no appreciable effect on the body-weight increment; while with a daily administration of the agent exceeding 30 mg., there was observed not only no prominent increment in bodyweight, but there also was found a rather undesirable effect of coagulation of albuminous substances on the mucous membrane of the intestine of the reared animals.

It is an advantage of the present invention that the hydroxamic acid may be administered to the livestock at a lower cost than the conventionally employed antibiotics. In addition, with the new agent, there ocurs no undesirable effects such as an accumulation of the said agent in the body or organs of the reared animals and an acclimation of the animals towards the agent so that the animals become insensible to the latter, contrary to the known antibiotics hitherto employed as the growth-promoting agent. The substance is decomposed in the organs of the animal into an amine and fatty acid which are harmless to the human body.

The following is an exhibition, by means of experiments, of the effect of the new growth-promoting agent on livestock, achievable by capryl hydroxamic acid which may be used most extensively as the growth-promoting agent according to the present invention.

Typical compounds suitable for the growth-promoting agent according to the present invention are acetohydroxamic and capryl hydroxamic acids.

Among the above compounds, capryl hydroxamic acid is found most preferable, because the said compound exhibits a strong anti-urease activity.

EXPERIMENT 1

(1) Piglets under test: Eight five-day-old piglets (six males and two females) were divided into two groups, that is, one "test group" (hereinafter called Group A) and the other "comparison or control group" (hereinafter called Group B), each of which was arranged to consist of three males and one female.

(2) Feed: During the first month of the feeding, an artificial milky feed (a) was give to the piglets of Group A. Thereafter, the feeding was followed by another artifical milky feed (b). Both of the feeds contained the ingredients listed in the Table I. The feed (a) fed to the piglets of Group A further contained 3 mg./kg. of capryl hydroxamic acid, while the feed for the piglets of the Group B did not contain the hydroxamic acid.

TABLE I

|  | Percent | | | | | |
|---|---|---|---|---|---|---|
|  | Moisture | Crude albumin | Crude fat | Crude cellulose | N.F.E.[1] | Ash |
| Feed (a) | 9.3 | 24.4 | 7.6 | 0.6 | 49.4 | 8.7 |
| Feed (b) | 10.6 | 24.7 | 9.8 | 2.1 | 45.5 | 7.3 |

[1] Nitrogen-free extract.

(3) Feeding method: The Groups A and B of the piglets were reared separately in a Danish hogpen of 2.4 m. x 3.7 m. Feeds in a powdery form containing the above ingredients were administered respectively to the two groups through feeding vessels. The amounts of the feed were appropriately controlled depending on the status of defecation of the test animals. Tap water was supplied so as to allow the piglets to drink it freely. The feeding was continued for 42 days.

(4) Observation of the results of feeding: The effects of daily administration of 3 mg./kg. of capryl hydroxamic acid for 42 days are shown in Table II.

TABLE II
[Average body-weight (kg.) of the animals under test]

| | Initial period | After 14 days | After 28 days | After 35 days | After 42 days | Percent development in body-weight |
|---|---|---|---|---|---|---|
| Group A | 2.55 | 2.95 | 4.15 | 5.63 | 8.33 | 123 |
| Group B | 2.73 | 3.25 | 4.18 | 5.18 | 7.28 | 100 |

As is seen from the table, the increment in the body-weight of the piglets of Group A surpassed those of Group B after feeding for 35 days. Further preferred growth of the piglets of the Group A was observed through a gradually increasing supply of the feed. And, at the end of the experiment, the piglets of Group A showed about 23% increase in development in the final body-weight of these piglets over the counterpart of the Group B.

(5) Feed conversion of feed: Because the two groups A and B of the piglets were reared under controlled feed, it was observed that the feed conversion of the group A was superior to that of the Group B, the comparative ratio of the feed conversions of the Groups A and B being approximate 4.71:6.48.

(6) Estimation of ammonia contents in the blood of reared piglets: Upon the final weighing of the reared piglets of the two Groups A and B, each 10 ml. of venous blood was taken therefrom respectively by using sodium fluoride as an anti-coagulant. From the blood, albuminous substance were removed. The blood free from the albuminous substance were colored with Nessler's reagent. The colorimetric estimation of the ammonia-contents in the blood by means of a photo-electric colorimeter demonstrated a very good result in the animals of Group A. The ammonia contents (mg./100 ml.) in the blood of animals of the Groups A and B were in the ratio of 0.16:0.30.

EXPERIMENT 2

Effect of capryl hydroxamic acid on body-weight increment of calves (1) Calves under test: Eight three-month-old calves (male) were divided into groups, that is, Group A as a test group and Group B as a comparison or control group.

(2) Feed: The artificial feed used in this experiment had a composition consisting of 13.1% of albumin, 7.1% of fatty matter, 45.0% of carbohydrate, 1.5% of common salt, 1.5% of $CaCO_3$ and 31.9% of the miscellaneous substances, all the percent (%) being by weight.

(3) Feeding method: The calves of the Group A were fed with the above feed which contained capryl hydroxamic acid in the amount of 3 mg. per kg. of the body-weight of the calves, while the calves of the Group B were fed with the feed which contained no capryl hydroxamic acid.

In the day time, all the calves of the Groups A and B were taken out to feed in the meadow. The artificial feed was appropriately mixed with cut hay or dry rice-straw. Tap water was sufficiently supplied so as to enable the calves to drink it freely, just in the same manner as in the feeding of the aforementioned piglets. The feeding lasted nine months.

(4) Observation of result of the feeding: As a result of the nine-month daily administration of the capryl hydroxamic acid in the amount of 3 mg. per kg. body-weight to the calves of Group A, a positive effect on the body-weight increment of the calves was observed after two months. It was found upon completion of the full nine-month administration that the calves of the Group A had put on weight 8.3% greater than those of the Group B. The result of the observation is given in Table III.

TABLE III
[Average body-weight (kg.) of the calves under test]

| | Initial period | After 2 months | After 4 months | After 6 months | After 9 months | Percent development in body-weight |
|---|---|---|---|---|---|---|
| Group A | 107.6 | 169.2 | 248.6 | 304.0 | 378.5 | 108.3 |
| Group B | 107.3 | 163.0 | 235.0 | 283.1 | 349.5 | 100 |

The following operative examples further illustrate the invention.

EXAMPLE 1

Growth-promoting feed for porkers weighing 30 kg. was prepared by blending 1.5 kg. daily ration of raw porker feed with 90 mg. (mg. per kg. of the body-weight; 0.006% in the finishing feed) of capryl hydroxamic acid. The raw porker feed sold by the Nippon Shiryo Manufacturing Co. was used.

EXAMPLE 2

Growth-promoting feed for breeding pigs weighing 90 kg. was prepared by blending 3.5 kg. daily ration of raw feed for breeding pigs with 1.8 g. (20 mg. per kg. of the body-weight; 0.51% in the finishing feed) of acetohydroxamic acid. The feed for breeding pigs sold by the Nippon Shiryo Manufacturing Co. was used.

EXAMPLE 3

Growth-promoting feed for porkers weighing 30 kg. was prepared by blending 1.5 kg. daily ration of raw porker feed with 900 mg. (30 mg. per kg. of the body-weight; 0.06% in the finishing feed) of capryl hydroxamic acid. The raw porker feed sold by the Nippon Shiryo Manufacturing Co. was used.

EXAMPLE 4

Growth-promoting feed for milking cows weighing 110 kg. was prepared by blending 2 kg. daily ration of raw feed, with 330 mg. (3 mg. per kg. of the body-weight) of capryl hydroxamic acid. The raw feed for milking cows sold by the Nippon Shiryo Manufacturing Co. was used.

What we claim is:

1. A method for the growth-promotion of cows, calves, pigs or piglets, which comprises feeding daily a growth promoting amount of about 1–30 mg. per kg. of the body-weight to said cows, calves, pigs or piglets, of a hydroxamic acid represented by the formula:

R—CO—NH—OH wherein R stands for alkyl of 1 to 12 carbon atoms, in admixture with a conventional feed therefor.

2. A method as claimed in claim 1 wherein the hydroxamic acid has the formula:

$CH_3(CH_2)_6CONHOH$

3. A feed for cows, calves, pigs or piglets comprising a mixture of a conventional feed for said cows, calves, pigs or piglets and a hydroxamic acid represented by the formula:

R—CO—NH—OH wherein R stands for alkyl of 1 to 12 carbon atoms, said hydroxamic acid being present in a growth promoting amount.

4. A feed as claimed in claim 3 wherein the hydroxamic acid has the formula:

$CH_3(CH_2)_6CONHOH$

5. A feed as claimed in claim 4 wherein the hydroxamic acid is present at .006% by weight based on the feed.

6. A feed as claimed in claim 4 wherein the hydroxamic acid is present at .51% by weight based on the feed.

References Cited

UNITED STATES PATENTS 3,364,110 1/1968 Lehr et al. ........... 424—298
3,444,232 5/1969 Bernstein ........... 424—298
3,474,132 10/1969 Bernstein ........... 424—298

JEROME D. GOLDBERG, Primary Examiner

V. D. TURNER, Assistant Examiner

U.S. Cl. X.R.

99—2 G; 424—327